June 20, 1961

L. E. LEE 2,989,077

SELECTOR VALVE

Original Filed March 29, 1957

INVENTOR
LUTHER E. LEE

BY
Claude Funkhouser
ATTORNEY

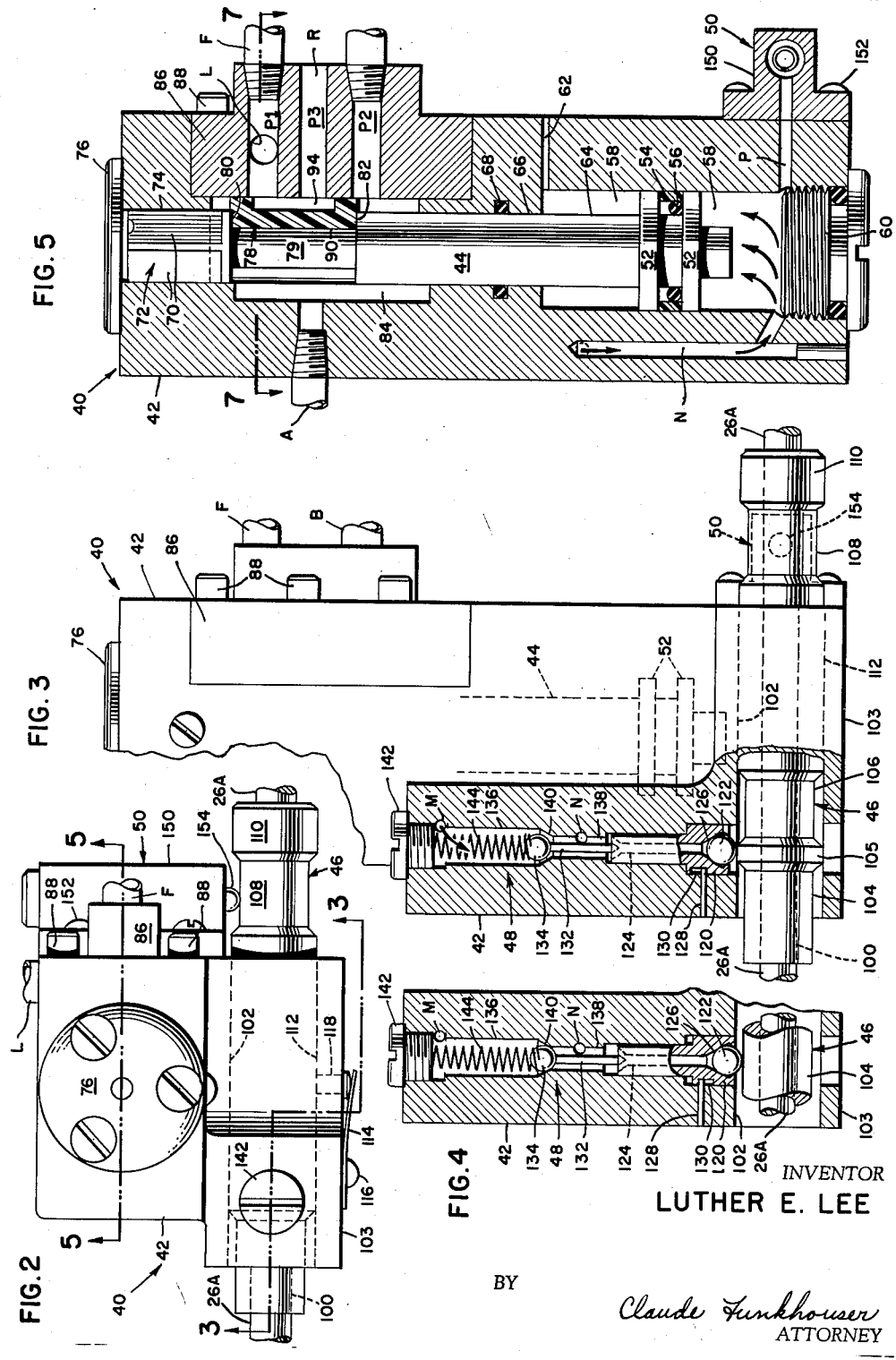

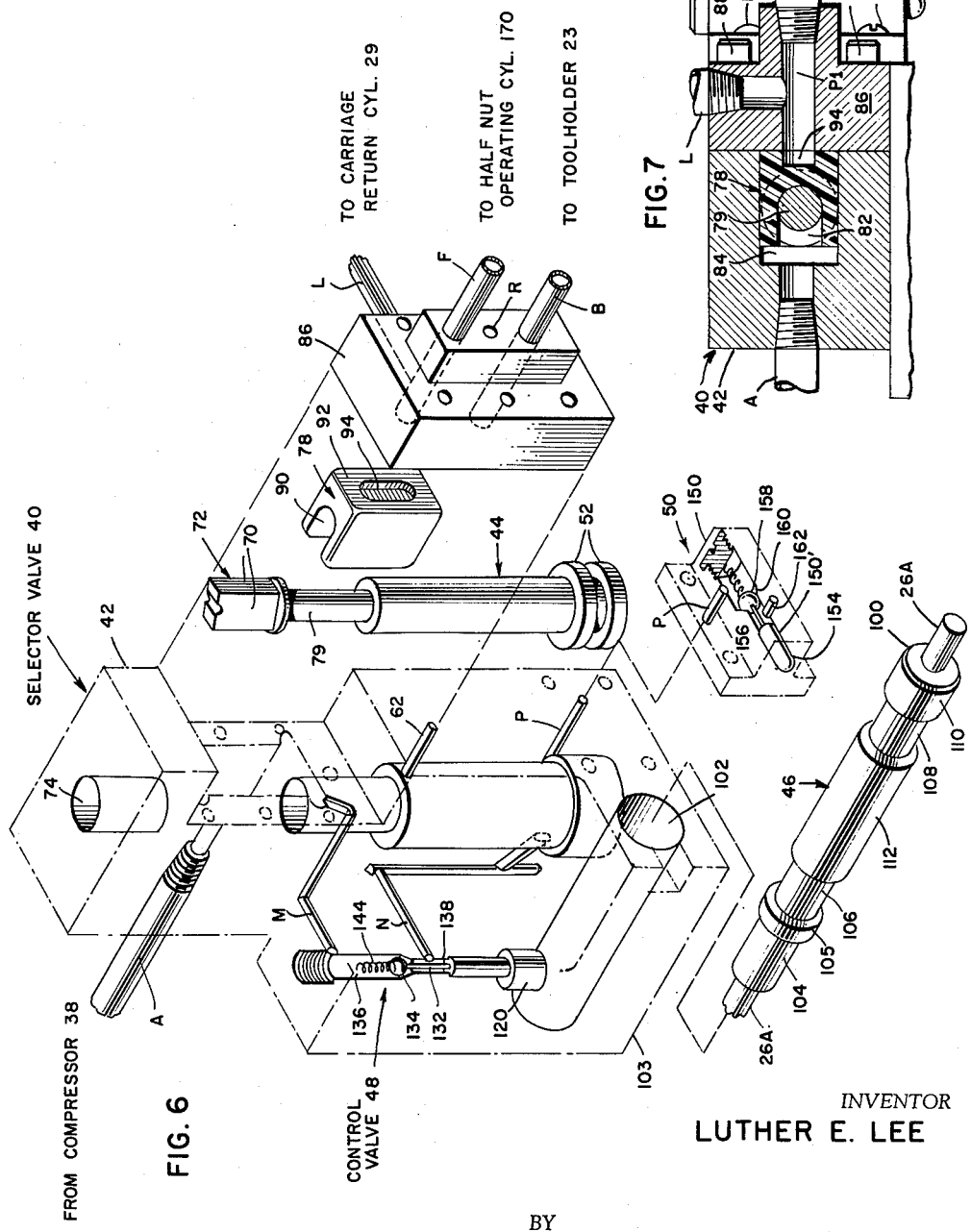

United States Patent Office 2,989,077
Patented June 20, 1961

2,989,077
SELECTOR VALVE
Luther E. Lee, 6625 Eastern Ave., Takoma Park, Md.
Original application Mar. 29, 1957, Ser. No. 649,580, now Patent No. 2,897,790, dated Aug. 4, 1959. Divided and this application Mar. 26, 1959, Ser. No. 802,268
10 Claims. (Cl. 137—620)
(Granted under Title 35, U.S. Code (1952), sec. 266)

The invention described herein may be manufactured and used by or for the Government of the United States of America for governmental purposes without the payment of any royalties thereon or therefor.

The instant invention is a division of Patent No. 2,897,790, filed by Luther E. Lee on March 29, 1957, for Fluid Control System for Machine Tools.

The present invention relates to a valve and more particularly to a selector valve for use in a pneumatic control system for effecting the automatic operation of a machine tool, such as a lathe, for turning and thread chasing operations.

The present invention provides a new and improved fluid actuated selector valve for controlling the movement of an automatically advanced cutting tool into and out of a workpiece at specific timed intervals. Furthermore, the present invention controls the longitudinal movement of the cutting tool along the workpiece and, upon the completion of a forward cutting stroke, returns the tool to its initial position at which time the tool automatically advances to another cutting increment before being moved into the workpiece for the next cutting cycle.

An object of the present invention is to provide a new and improved selector valve for a pneumatic system capable of controlling automatically the multistage operations of a lathe during turning and thread cutting operations.

Another object of this invention resides in the provision of a novel valve for selectively controlling fluid pressure in a pneumatic system, the valve being capable of instantaneous response during high speed, automatic lathe operations.

A further object of this invention is to provide a novel valve having movable actuating means slidably carried thereby, wherein extremely small movements of the actuating means in forward and/or reverse direction result in a rapid operation of the valve.

Another object of the present invention is to provide a novel valve operable by differential pressures from a single pressure source and capable of quick response to small increments of terminal carriage travel in one and/or in the opposite directions.

Other objects and many of the attendant advantages of this invention will be readily appreciated as the same becomes better understood by reference to the following detailed description when considered in connection with the accompanying drawings wherein:

FIG. 2 is a top plan view of the novel selector valve employed with the system of FIG. 1;

FIG. 3 is a side elevational view of the selector valve with parts broken away along a line substantially corresponding to line 3—3 in FIG. 2, with the ball check valve in an open position;

FIG. 4 is a fragmentary vertical sectional view of the valve illustrated in FIG. 3 with the ball check valve in a closed position;

FIG. 5 is a longitudinal sectional view of the selector valve taken along a line substantially corresponding to line 5—5 in FIG. 2;

FIG. 6 is an exploded view of the selector valve, the valve body being shown in dashed lines to facilitate comprehension of the arrangement of the valve elements and the internal passages; and FIG. 7 is a transverse sectional view taken substantially along the line 7—7 of FIG. 5.

Figure 1:
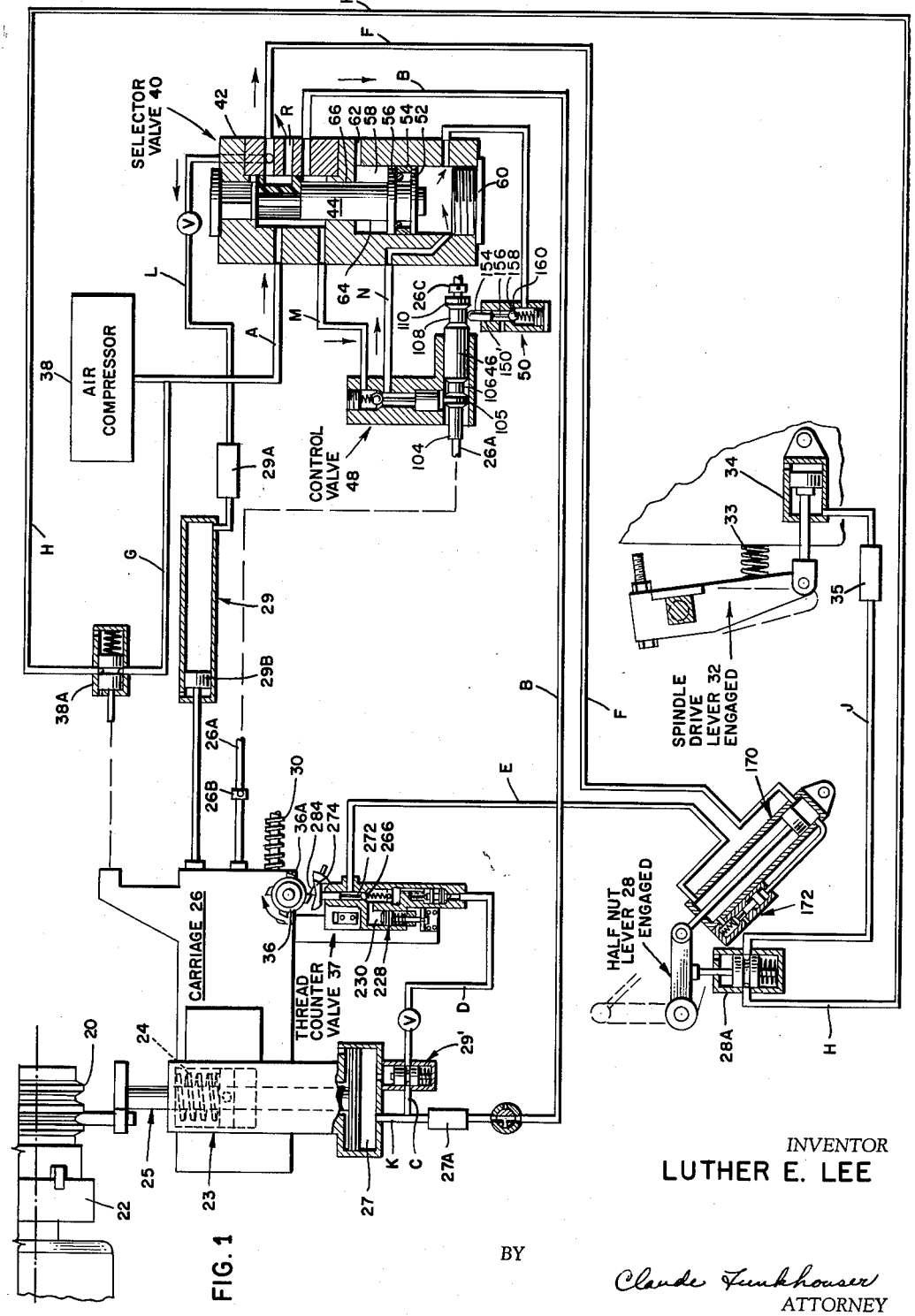
FIG. 1 is a diagrammatic view illustrating the selector valve of the present invention in connection with a machine tool fluid control system and showing the relative positions of the elements thereon when the tool carriage of the machine tool is moving in a forward cutting stroke.

Referring to the drawings, and particularly to FIG. 1, the selector valve of the invention and generally indicated by the numeral 40 is illustrated as being connected in a fluid control system suitable for use on a conventional engine lathe, parts of which are diagrammatically shown, such as the type employed in turning and thread cutting operations. The lathe mounts a rotatable workpiece 20 supported at one end in a head stock 22, the opposite end being supported in any conventional manner. An automatic, step advancing toolholder 23, such as disclosed in my Patent No. 2,889,754, filed March 1, 1954, for Machine Tool, is secured to the conventional cross-feed slide (not shown) for preliminary positioning of the toolholder with relation to the workpiece. A carriage 26 supports the toolholder 23 for longitudinal forward and rearward movement along conventional lathe bed ways (not shown), the carriage 26 being driven forwardly during thread cutting operations by engagement of half-nut lever 28 coacting with a lead screw 30. Other conventional lathe elements include a clutch for the spindle drive, operable by spindle drive lever 32, and a thread counter dial 36 which rotates at a speed indicative of the lead screw rotation.

It will be noted on FIG. 1 that the selector valve 40 is connected to an air compressor 38 or other suitable source of pressurized air for supplying air from 60 to 100 pounds per square inch to the selector valve by way of conductor A. The selector valve 40 comprises a valve body 42 which houses a vertically reciprocable piston 44, and a horizontally slidable cam sleeve 46 engageable with the control valve 48 and release valve 50. The selector valve piston 44 is formed at the lower end thereof with an enlarged head 52 suitably sealed by compression ring 54 and O-ring 56, as best shown on FIG. 5, the head being reciprocable in chamber 58 formed in the body 42. The lower end of the chamber 58 is normally sealed from the atmosphere by means of screw plug 60 and is in communication with control valve 48 and release valve 50 by means of conduits N and P, respectively, FIG. 1. The upper end of chamber 58 is vented at 62 to permit free upward movement of the piston head 52 within the chamber as the pressure is applied to one surface thereof by way of conduit N, FIG. 5. The selector valve piston 44 above and adjacent the head 52 is provided with a reduced portion 64 and is slidably supported within an opening or bore 66 formed in the valve body 42, FIG. 5, and disposed intermediate the ends thereof. A suitable sealing ring 68 carried by the valve body 42 and bordering on bore 66 in engagement with portion 64 of piston 44 is utilized to prevent air passage from the chamber 58 to the upper end of the valve body and into chamber 84. The upper end of the valve piston 44 is of substantially the same diameter as the lower reduced portion 64 and is provided with a plurality of flat surfaces 70 formed on one terminal end thereof to form a squared end 72. The squared end 72 is slidably supported within an upper chamber 74 formed in the valve body 42, the chamber receiving pressurized air from chamber 84 depending upon the position of the aforesaid piston 44 which position is controlled by the cam sleeve 46. The upper chamber 74 is sealed by a cap 76 which also serves to limit the upward travel of piston 44. A slide valve generally indicated by the reference character 78 is supported on the valve piston between a pair of upper and lower shoulders 80 and 82, respectively, as best shown on FIG. 5, formed by further reducing the diameter of member 64 as at 79 between the upper squared end 72 and the lower shoulder 82 of member 64. The slide valve 78 is formed of any material suitable for the purpose such, for example, as "Teflon," the valve being vertically reciprocable with the piston 44 and movable within the aforesaid chamber 84, the chamber being of sufficient size to allow air passage around members 64 and 78 of the piston and the areas adjacent the slide valve, FIGS. 5 and 7.

Referring now to FIGS. 5 and 6, it will be noted that the valve body 42 is cut away at one side thereof to receive a block or retaining member 86, the block being bored to form an air passage P1 for a carriage return conduit L, an air passage P2 for a toolholder conduit B, an air passage P3 for a carriage feed operating cylinder reverse conduit F and a vent R common to the foregoing. The block is secured in any suitable manner and is illustrated as being secured by a plurality of bolts 88 to the valve body 42. The interior face of the block 86 communicates with the enlarged central chamber 84 and also forms a pressure tight seal against one face of the slide valve 78. The slide valve is shown in FIG. 6 to be substantially rectangular in configuration with a U-shaped slot 90 formed along the longitudinal axis thereof. The walls defining the slot 90 of valve 78 engage the reduced portion 79 of piston 44 while the upper and lower ends of the valve are retained in position by the aforesaid upper and lower shoulders 80 and 82, respectively. One face 92 of the slide valve 78 is partially cut away to form a communicating passage 94 between the vent R and either the paired conduits F and L or the conduit B.

Referring to FIG. 5, the piston 44 is shown as being substantially at the limit of its travel, the slide valve 78 being positioned to allow vented air from the half-nut operating cylinder conduit F to pass via slide valve passage 94 and thus to vent R to atmosphere. Air compressor conduit A enters the valve body 42 from the side opposite that of the slide valve 78 and communicates with central chamber 84. With the slide valve 78 in the position shown, FIGS. 1 and 5, air under pressure enters chamber 84, passes about the piston 44 and is ported to the toolholder 23 via conduits B and K.

Referring now to FIGS. 1, 3, 4 and 6, it will be noted that a cylindrical cam sleeve 46 is slidably arranged within the casing 42 at one end thereof, the sleeve being provided with a centrally disposed bore 100 extending therethrough to accommodate the carriage control rod 26A, which is slidable therethrough and which is actuated in response to the movement of the carriage. The cam sleeve 46 is slidably disposed within a horizontal bore 102 formed in an offset portion 103 integral with and disposed at one end of the valve body 42. By this arrangement the sleeve 46 moves at right angles with respect to the movements of the selector valve piston 44. As best shown in FIGS. 3 and 6 the cam sleeve 46 is reduced in diameter adjacent one end thereof as at 104 and 106 to form a raised annular cam 105 therebetween, the cam being constructed and arranged to actuate the aforesaid control valve 48. The opposite end of the cam sleeve 46 is provided with a reduced portion 108 to form another annular cam 110 at the terminal end thereof, this cam being constructed and arranged to actuate the aforesaid control valve 48. The opposite end of the cam sleeve 46 is provided with a reduced portion 108 to form another annular cam 110 at the terminal end thereof, this cam being constructed and arranged to actuate the aforesaid release valve 50. The intermediate portion 112, FIGS. 1 and 6, of the cam sleeve 46 disposed between the two aforementioned cams 105 and 110 is of uniform diameter to slidably engage the mating cylinder bore 102 formed in the offset portion 103 of the valve body 42. As best shown in FIG. 2, the sleeve 46 is prevented from excessive longitudinal movement by means of a leaf spring 114 secured at 116 to the offset portion 103 of the valve body 42, the free end of the spring bearing against a pin 118 frictionally engaging the intermediate portions 112 of the sleeve 46.

Details of the aforesaid control valve 48 are best illustrated in FIGS. 3, 4 and 6 wherein it will be observed that the lower end of the control valve 48 comprises a stem or sleeve 120 having ball 122 disposed in the lower end thereof for engagement with cam 105 on sleeve 46 to maintain the valve in an open position or with the reduced portion 106 in the sleeve to maintain the valve in a closed position. The stem 120 is centrally bored as at 124, the ball 122 being disposed and maintained in a seat 126 formed in one end of stem 120 thereby to seal the bore 124 during operation of the valve. This is accomplished by reason of spring 144 when the valve is in a closed position, FIG. 4, and by the aforesaid spring together with the fluid pressure when the valve is in an open position, FIG. 3. A pin 128 mounted in the valve body 42 engages a slot 130 formed in the stem at the lower end thereof and functions to limit vertical movement of the stem. The upper end of the stem 120 has integrally formed therewith a lifter pin 132 in engagement with a ball 134, the ball normally separating an upper chamber 136 from a lower chamber 138 by engagement with a valve seat 140. The upper chamber 136 is closed by means of cap 142 which engages one end of a spring 144, the other end of the spring being in engagement with the ball 134 thereby normally maintaining ball 134 in engagement with valve seat 140. As best shown in FIG. 6, the upper chamber 136 of control valve 48 communicates with the fluid pressure source by means of conduit M connected thereto and to chamber 84 at a point adjacent the lower end of slide valve 78. The lower chamber 138 in turn communicates with the chamber 58 in the lower end of the casing 42 and adjacent the selector valve piston head 52 by way of conduit N. Thus, in FIG. 1, it will be apparent that as pressure air enters the selector valve 40 the air will travel via conduit M, through the upper chamber 136, past the ball 134, thence via conduit N to the lower chamber 58 of the selector valve and adjacent piston head 52 thus raising the piston to the upper selected position.

The release valve 50, as illustrated in FIGS. 1 and 6, comprises a valve body 150, bolted or otherwise secured to the selector valve body 42 as at 152, FIGS. 2 and 5, the body 150 having a bore 150' to receive a plunger 154 engageable at one end with cam portion 108 and cam 110 formed on sleeve 46, as best shown on FIG. 1. It will be understood that the plunger 154 is normally in engagement with aforesaid cam 108. The opposite end of the plunger 154 carries a pin 156 in engagement with a spring biased ball 158 normally maintained in engagement with a valve seat 160 formed within the casing 150. When the ball 158 is in engagement with seat 160, a vent passage 162 in communication with bore 150' will be cut off from conduit P which communicates with chamber 58 in the lower end of the selector valve casing 42 adjacent piston head 52. Moving the sleeve 46 in one direction in response to carriage movement will move cam surface 112 into engagement with plunger 154 and cause the plunger 154 to move the ball 158 out of engagement with seat 160 and thus vent the chamber 58 of the selector valve 40 rapidly with minimum carriage travel as reflected by small increments of sleeve movement.

The aforesaid cam sleeve 46 slidably receives an actuating rod 26A mounted on and moveable with the carriage 26, the rod having adjustably mounted thereon a pair of striker or sleeve actuating members 26B and 26C being disposed at the left-hand side of the sleeve 46 and striker 26C being disposed at the right-hand side of the aforesaid sleeve. By this arrangement and as the carriage moves rearwardly and approaches its initial starting position the striker 26C on rod 26A engages the sleeve at the right-hand side thereof in response to movement of the rod 26A by the carriage causing control valve 48 to provide a seal by reason of the aforesaid ball 122 and seat 126, whereupon pressure fluid is ported from chamber 84 in valve 40 by conduit M, control valve 48 and thence to chamber 58 by way of conduit N.

The operation of the valve in connection with the system as disclosed in FIG. 1 will now be briefly described. An air compressor 38, or any other suitable source of pressurized air, supplies air at pressures of 60 to 100 pounds per square inch via conduit A to a selector valve 40. Depending upon carriage orientation, a horizontally movable cam sleeve 46, actuated only during the final stages of movement of the carriage in either the forward or rearward direction, is utilized to position a control valve 48 in the selector valve 40 to an open or closed position, in which positions air is either ported to the upper or lower ends of a selector valve piston 44. Positioning of the selector valve piston 44 in the up position ports pressure fluid to the various elements of the system causing initiation of a work cycle in the forward direction. Upon termination of a work cycle, the carriage repositions the cam sleeve 46 closing control valve 48 and opening release valve 50, thus venting the lower end of the selector valve piston 44 to the atmosphere. Selector valve piston 44 now moves to the down position upon application of pressure fluid to the upper end thereof.

With the selector valve piston 44 in the up position, as shown in FIG. 1, pressure fluid is ported from within the selector valve 40 via conduits B and K to a toolholder driving piston chamber 27, thus urging a toolholding ram 25 into the workpiece. A pressure response valve 29′, actuated by a predetermined pressure buildup within the piston chamber 27, now opens and ports pressure fluid from conduit K via conduits C and D to the lower end of a thread dial indicator valve or thread counter valve 37. The pressure is controlled by selector valve 40 in communication with a source of pressure 38 and with chamber 27 by way of conduit B and vent valve 27A disposed therein.

Thread counter dial or thread dial indicator 36 is provided with a series of cam lobes 36A affixed thereto and upon positioning of the thread counter valve 37 in engaged relationship, cam lobes 36A strike a variable cam 284 to open the thread counter valve 37 at precisely timed intervals. In order to synchronize the engagement of the half-nut lever 28 with the arrival of a predetermined lobe 36A in engagement with variable cam 284 during rotation of the thread counter dial 36, the thread counter valve 37 is caused to be moved into an operating or cam engaging position as the pressure in chamber 230 of counter valve 37 reaches a predetermined value, whereupon the aforesaid cam 284 engages one of the cams 36A as the dial 36 rotates. Upon engagement of cams 284 and 36A, check valve 266 is opened by stem 272 on cam housing 274, whereupon air passes through conduit E to one side of a half-nut lever operating cylinder 170 to operate the half-nut lever 28. At this stage of the cycle the rotating thread counter dial 36 automatically stops and thread check valve 266 remains open for the remainder of the thread cutting cycle.

Residual air in the opposite end of the operating cylinder 170 is vented by means of conduit F leading back to the selector valve, the residual air passing through slide valve 78 and thence to atmosphere via vent R. With the half-nut lever 28 fully engaged, an indicator valve 28A opens and pressure fluid now is directed from the compressor 38 via conduit G through a carriage overtravel safety valve 38A (normally open) via conduit H to the open indicator valve 28A and thence to the spindle drive operating cylinder 34 via conduit J and check valve 35.

At this stage of a thread cutting cycle, the toolholder has been advanced into the rotating workpiece and the carriage is traveling to the right or, in other words, in a forward direction. Upon termination of the desired carriage travel to the right, the cam sleeve 46 is caused to be moved to the right by means of a forward adjustable striker 26B mounted on a carriage control rod 26A. At this same time, residual air from a carriage return cylinder 29 is vented by means of check valve 29A as a carriage mounted return piston 29B moves to the right in the cylinder. Movement of the cam sleeve 46 causes control valve 48 to be closed, thus terminating the flow of pressure air to the lower end of the selector valve piston 44. Pressure via conduit A now is applied to the upper end of the selector valve piston 44, thus forcing the piston downward. Passage of air to the toolholder is now blocked by slide valve 78 and a toolholder return spring 24 now forces the ram 25 away from the workpiece 20. Air from piston chamber 27 is rapidly vented by means of the check valve 27A mounted between conduits K and B adjacent the chamber 27.

The afore-mentioned operations now occur in reverse order: Pressure response valve 29′ closes, thread counter valve 37 retracts from engagement with the thread counter dial 36, the dial now resumes rotating; the half-nut lever operating cylinder 170 is reversely operated by pressure fluid via conduit F and is fast vented by means of release valve 172 to disengage the half-nut lever 28, causing its indicator valve 28A to close by spring pressure. A return spring 33 now moves the spindle drive lever 32 to a disengaged position, the spindle drive operating cylinder 34 also being fast vented by means of check valve 35.

Simultaneous with the foregoing operations, incoming pressure air from conduit A is now free to bypass the downwardly moved slide valve 78 and is ported via conduit L to the carriage return cylinder 29 thus moving the carriage rearwardly prior to commencing the next thread cutting cycle. As the carriage moves rearwardly and approaches its initial starting position, a rearward adjustable striker 26C engages the right end of the cam sleeve 46 causing control valve 48 to reseal the lower end of selector valve 40. Pressure fluid now in the selector valve 40 leaves via conduit M, control valve 48 and thence via connecting conduit N to the lower end of the selector valve piston 44 causing upward movement thereof. A new cutting cycle is now resumed as the toolholder 23 automatically advances another cutting increment as previously described.

Obviously many modifications and variations of the present invention are possible in the light of the above teachings. It is therefore to be understood that within the scope of the appended claims the invention may be practiced otherwise than as specifically described.

What is claimed is:

1. A selector valve of the character described for porting pressure fluid to various pressure actuated elements of a machine tool comprising a casing, a pressure responsive piston slidably arranged within said casing, a source of fluid pressure in communication with said casing for applying pressure to one side of the piston, a normally open control valve in communication with said casing for supplying pressure to the other side of said piston, movable means in engagement with said control valve for maintaining said control valve in an open position until said movable means is moved a predetermined amount, means in engagement with said control valve for closing said control valve when the movable means is moved said predetermined amount, a normally closed release valve in engagement with said movable means in communication with said casing and actuated to an open position as said movable means is moved said predetermined amount for releasing the pressure at said other side of the piston to allow the piston to be moved from an initial position to a final position by said pressure at said one side of the piston as the control valve is closed, means in engagement with said release valve for closing said release valve, port means in said casing, and a slide valve carried by and movable with said piston for rendering said port means effective when the piston is in said initial position and when the piston has been moved to said final position.

2. A selector valve according to claim 1, wherein said slide valve includes a body having a U-shaped slot formed therein for receiving said piston and a passageway in communication with said port means when the piston is in said initial and the final positions.

3. A selector valve according to claim 1 including means in engagement with said control valve for moving said valve to a closed position when the movable means has been moved a predetermined amount, means on said movable means for moving said release valve to an open position when said movable means has been moved said predetermined amount.

4. A selector valve according to claim 1, wherein said movable means includes a sleeve having valve engaging elements thereon for selectively opening said control and release valves in response to the direction of movement of the movable means.

5. A selector valve according to claim 1, wherein said movable means includes cam means normally in engagement with said control valve for maintaining said valve in an open condition until said movable means has been moved a predetermined amount, additional cam means on said movable means in engagement with said release valve for maintaining said valve in a closed condition until said movable means has been moved said predetermined amount, additional cam means on said movable means for moving said release valve to an open position when the movable means has been moved said predetermined amount.

6. A selector valve according to claim 1, wherein said control valve includes a casing having a ball check disposed therein, plunger means arranged within said casing in engagement with said movable means and the ball check for maintaining said ball check in an open position, a spring in engagement with said ball check and the casing for moving said ball check to a closed position when said movable means is moved said predetermined amount, means in said casing for mounting said movable means in the path of travel plunger means.

7. A selector valve according to claim 1, wherein said release valve includes a casing having a ball check disposed therein, spring means for maintaining said ball check in a normally closed position, plunger means arranged within said casing in engagement with said ball check and the movable means for moving said ball check to an open position when said movable means is moved said predetermined amount.

8. A selector valve comprising a casing having an upper and a lower chamber therein, a source of fluid pressure in communication with said upper and lower chambers, movable cam means carried by said casing, a pressure responsive element slidably disposed within the casing and extending into said upper and lower chambers, means controlled by the position of said pressure responsive element for alternately porting and exhausting the fluid from the upper chamber, and means controlled by said movable cam means for alternately supplying and exhausting the fluid to and from said lower chamber.

9. A selector valve comprising a casing, a pressure responsive element slidably carried within the casing, means for supplying fluid under pressure to one side of said pressure responsive element, movable cam means on the casing, a first means controlled by the position of said movable cam means for supplying said fluid to the other side of the pressure responsive element, a second means controlled by the position of said movable cam means for exhausting said fluid from said other side of the pressure responsive element, a third means controlled by the position of the pressure responsive element for porting the fluid from said one side of the pressure responsive element, fluid return means for returning the fluid to said one side of the pressure responsive element, and a fourth means controlled by the position of the pressure responsive element for exhausting the fluid as the fluid is returned to said one side of the pressure responsive element.

10. A selector valve comprising a casing, a pressure responsive element slidably carried within the casing, means for supplying fluid under pressure to one side of said pressure responsive element, normally open means for supplying said fluid to the other side of the pressure responsive element, movable cam means for maintaining the normally open means in an open position in accordance with the position of said movable cam means, means for closing said normally open means in accordance with the position of the movable cam means, normally closed means actuated to an open position in accordance with the position of the movable cam means for releasing the fluid at said other side of the pressure responsive element, means for porting the fluid from said one side of the pressure responsive element in accordance with the position of the pressure responsive element, and means for exhausting the fluid from said one side of the pressure responsive element in accordance with the position of said element.

References Cited in the file of this patent

UNITED STATES PATENTS

| | | |
|---|---|---|
| 519,706 | Gorrell | May 15, 1894 |
| 1,198,216 | Hanson | Sept. 12, 1916 |
| 2,409,517 | Schmit | Oct. 15, 1946 |
| 2,491,355 | Adams | Dec. 13, 1949 |
| 2,882,930 | Lee | Apr. 21, 1959 |
| 2,889,754 | Lee | June 9, 1959 |
| 2,897,790 | Lee | Aug. 4, 1959 |